United States Patent
Whittaker (10) Patent No.: US 6,176,540 B1
(45) Date of Patent: Jan. 23, 2001

(54) MODULAR TOOL AND ACCESSORIES CARRIER FOR USE ON TRUCK BEDS

(76) Inventor: John Whittaker, 16213 Madison Ave., Lakewood, OH (US) 44107

(*) Notice: Under 35 U.S.C. 154(b), the term of this patent shall be extended for 0 days.

(21) Appl. No.: 09/514,121

(22) Filed: Feb. 28, 2000

(51) Int. Cl.[7] .................................................. B60P 7/02
(52) U.S. Cl. .............................. 296/100.02; 296/100.01; 296/100.07; 296/100.09
(58) Field of Search .................... 296/100.01, 100.02, 296/100.07, 100.09, 100.06, 163, 164; 49/36

(56) References Cited

U.S. PATENT DOCUMENTS

| | | | |
|---|---|---|---|
| 4,799,726 | * 1/1989 | Scott | 296/100 |
| 4,819,981 | 4/1989 | Moe . | |
| 4,943,108 | * 7/1990 | Turnbull | 296/100 |
| 5,056,855 | * 10/1991 | Moravsky | 296/98 |
| 5,102,180 | * 4/1992 | Finley | 296/37.6 |
| 5,228,739 | 7/1993 | Love . | |
| 5,398,987 | 3/1995 | Sturgis . | |
| 5,518,288 | * 5/1996 | Deklotz | 296/100 |
| 5,522,635 | 6/1996 | Downey . | |
| 5,593,201 | * 1/1997 | Bateman | 296/100 |
| 5,704,681 | 1/1998 | Lambden . | |
| 5,845,952 | * 12/1998 | Albertini et al. | 296/37.6 |
| 5,988,195 | * 11/1999 | Kaestner et al. | 135/144 |

* cited by examiner

*Primary Examiner*—D. Glenn Dayoan
*Assistant Examiner*—Mickki Murray
(74) *Attorney, Agent, or Firm*—Joseph H. Taddeo (57) ABSTRACT

The present invention relates primarily to a removable modular tool and accessories carrier for use on a pickup truck load bed. Each enclosed storage compartment module provides for the organizational arrangement of the contents, having centrally oriented bins suitable for the storage of larger tools and trays for carrying items, such as, replacement parts and materials. A pass-thru provides access to larger items stored on the existing load bed of the pickup truck. Each module is comprised of centrally hinged doors, opening upwardly for ease of access, mating with drop-down hinged doors. The upwardly opening doors are maintained in the open position using frictional snap-spring hold-opens. When both doors are in a closed position, a mechanical locking means provides the secure integrity of the contents being transported. Each module has a cascaded centrally located drip channel to direct the flow rainwater off the top of the cap and to prevent it from collecting by diverting it downwardly.

16 Claims, 7 Drawing Sheets

MODULAR TOOL AND ACCESSORIES CARRIER FOR USE ON TRUCK BEDS

FIELD OF THE INVENTION

The present invention relates primarily to a removable modular pickup truck enclosed storage compartment, and more particularly to a plurality of removable modular pickup truck enclosed storage compartments, used for the organizational arrangement of the contents, having a centrally hinged, upward opening access.

BACKGROUND OF THE INVENTION

Pickup truck caps are well known in the prior art. Disclosed are several truck caps having a multiplicity of diverse applications for caps that mount over the load bed of a pickup truck. Examples of such prior art are shown in the examples that follow.

U.S. Pat. No. 5,704,681, granted Jan. 6, 1998, to J. W. Lambden, discloses a side access truck cap described as an enclosure for the box of a pickup truck. The box of the pickup truck is defined by having a front wall, sidewalls and a rear gate. The truck cap enclosure has a front wall, sidewalls and a rear gate, forming a rectangle, and mountable atop the pickup truck box. The enclosure is pivotally connected along a selected sidewall, having a pair of lifting arms on the opposed sidewall, to assist in the lifting, and closing of the enclosure.

U.S. Pat. No. 5,552,635, granted Jun. 4, 1996, to D. Downey, discloses an apparatus for removeably attaching a tonneau cover to the bed of a pickup truck comprising, elongated plastic extrusions that are slidably inserted into the channels of elongated frame members.

U.S. Pat. No. 5,398,987, granted Mar. 21, 1995, to J. C. Sturgis, discloses a tool box assembly for use in a bed of a pickup truck comprising, a storage container having a door pivotable from the vertical closed position to a horizontal open position, the storage container being affixed to the pickup truck bed, where the tool box is pivotably attached to the storage compartment.

U.S. Pat. No. 5,228,739, granted Jul. 20, 1993, to D. Love, discloses a truck cap clamp having an L-shaped member and a U-shaped member laterally shiftably connected by a threaded bolt.

U.S. Pat. No. 4,943,108, granted Jul. 24, 1990, to S. Turnbull, teaches of a pickup truck cap for a pickup truck bed, the truck cap comprising a roof, split centrally longitudinally, and a pair of sidewalls, creating substantially equal split halves, hinged to the truck load bed sidewalls.

U.S. Pat. No. 4,839,981, granted Apr. 11, 1989, to G. L, Moe, et al., discloses a side opening removable truck cap being disposed over the load bed of a pickup truck. The cap may be swung open from either side of the load bed. An articulated spring biased link structure connects between the front and rear portions of the cap and pickup truck sidewalls whereby the opened side of the cap may be supported and maintained in the open position.

The prior art recited above does not teach of the novel advantages that are found in the present invention. Several teach of truck caps hinged to the sidewalls of the load bed, some having split halves, opening centrally, whereas others open in a cantilever manner to gain access to the interior of the truck load bed. Still others disclose pivotable toolbox enclosures securably attached to the truck bed. Another discloses a snap fitted tonneau cover using plastic extrusions.

Accordingly, it is therefore an object of the present invention to provide a novel portably removable pickup truck cap that is modular in construction, where each module is joined independently to each other, while maintaining an organizational means of storing the contents being carried.

It is another object of the present invention to provide a novel portably removable modular pickup truck cap, that when removed, are stackable for storage and having a minimal footprint in the storage area.

It is still another object of the present invention to provide a novel portably removable modular pickup truck cap, each module having centrally hinged upper doors that open upwardly and having doors that are maintained in the open position through the use of frictional snap-spring hold-opens.

It is still yet another object of the present invention to provide a novel portably removable modular pickup truck cap, each module having lower drop-down hinged doors that mate with the hinged upper doors to securely close each module.

Yet still, another object of the present invention is to provide a novel portably removable modular pickup truck cap, each module having a locking mechanism for each set of upper and lower doors for securing the contents being transported that lie within and beneath each module.

An additional object of the present invention is to provide a novel portably removable modular pickup truck cap, each module having cascaded centrally located drip cap to direct the flow rainwater off the top of the cap and to keep it from collecting by diverting it downwardly.

Still, an additional object of the present invention is to provide a novel portably removable modular pickup truck cap, each module having bins and trays to organize the contents being transported for ease of separating and inventorying each item.

Still yet, an additional object of the present invention is to provide a novel portably removable modular pickup truck cap, each module being secured and fastened by two hold-down clamps and each module being joined together using a plurality of attaching bolts.

A final object of the present invention is to provide a novel portably removable modular pickup truck cap, each module having a pass-through opening, giving access to items being stored and transported on the existing bed of the pickup truck.

These as well as other objects and advantages of the present invention will be better understood and appreciated upon reading the following detailed description of the preferred embodiment when taken in conjunction with the accompanying drawings.

SUMMARY OF THE INVENTION

The present invention relates primarily to a novel portably removable pickup truck cap that is modular in construction, where each modular compartment is joined independently to each other, while maintaining an organizational means of storing the contents being carried. Each truck cap modular carrier is secured and fastened to the sidewalls of a pickup truck by two hold-down clamps, where each module is first joined together using a plurality of attaching bolts.

Each of the modular compartments is stackable for conserving storage space, one on top of the other, thereby occupying a minimal footprint in the storage area, once removed from the load bed of a pickup truck.

Each modular carrier is comprised of centrally hinged upper access doors that open upwardly. Each centrally hinged upper access door is maintained in the open position using a frictional snap-spring hold-open. A lower side panel, drop-down, hinged access door is provided to close and mate with the hinged upper access door to securely close each module. A locking mechanism for each set of upper and lower doors provides for securing the contents being transported that lie within and under each modular compartment.

With both upper and lower doors in their respective open position, each module has a pass-through opening that gives direct access to items being stored and transported on the existing bed of the pickup truck. As such, the truck cap provides access to the entire truck bed while standing alongside the pickup. Thus, the tradesman or technician need not crawl or otherwise enter or squeeze under the cap to retrieve items. The tailgate, front wall, sidewall and lateral extension of each lower storage tray together define a reach-in or pass-through area to remove the largest tools or containers that are ordinarily stored there.

Tool bins and storage trays are provided to organize the contents being transported for ease of separating and inventorying each item. The bins and trays include several repositioning dividers aligned substantially normal with the direction of travel of the pickup truck for preventing longitudinal transition of the articles therein.

A centrally located drip cap, one that is cascaded from one modular compartment to another, directs the flow rainwater off the top of the cap and keeps it from collecting by diverting it downwardly via its respective channel.

BRIEF DESCRIPTION OF THE DRAWINGS

The present invention is pictorially illustrated in the accompanying drawings that are attached herein.

DETAILED DESCRIPTION OF THE INVENTION

Referring now to the drawings, the numeral 100 designates a pickup truck, having a forward cab 105 and rear load bed 110. The rear load bed 110 is bounded by front wall 115, right sidewall 120, left sidewall 125, each sidewall having a substantially inward facing upper peripheral portion, and rear tailgate 130.

Figure 1:
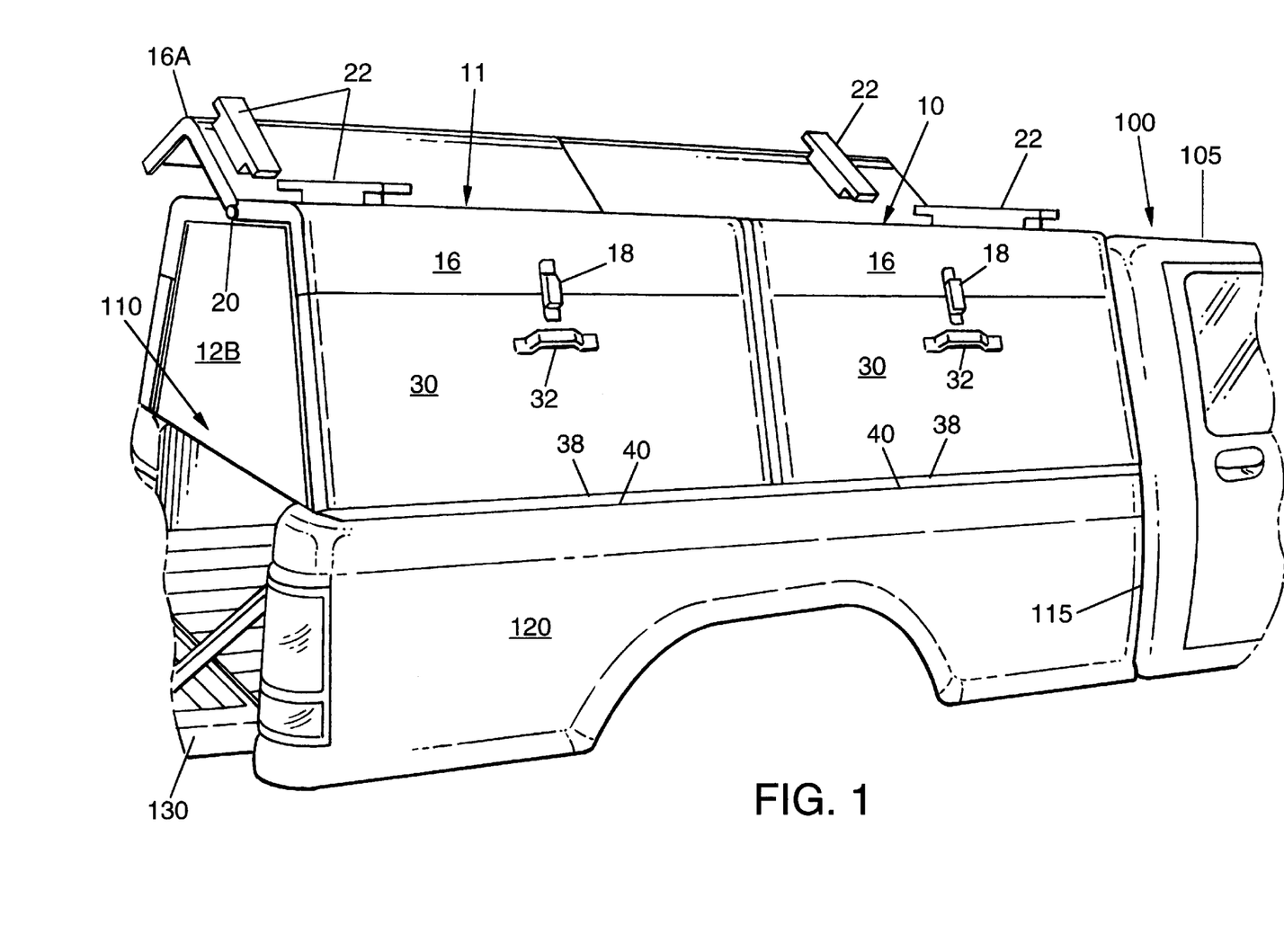
FIG. 1 is a right rear perspective view of the truck carrier showing access doors closed.
Figure 2:
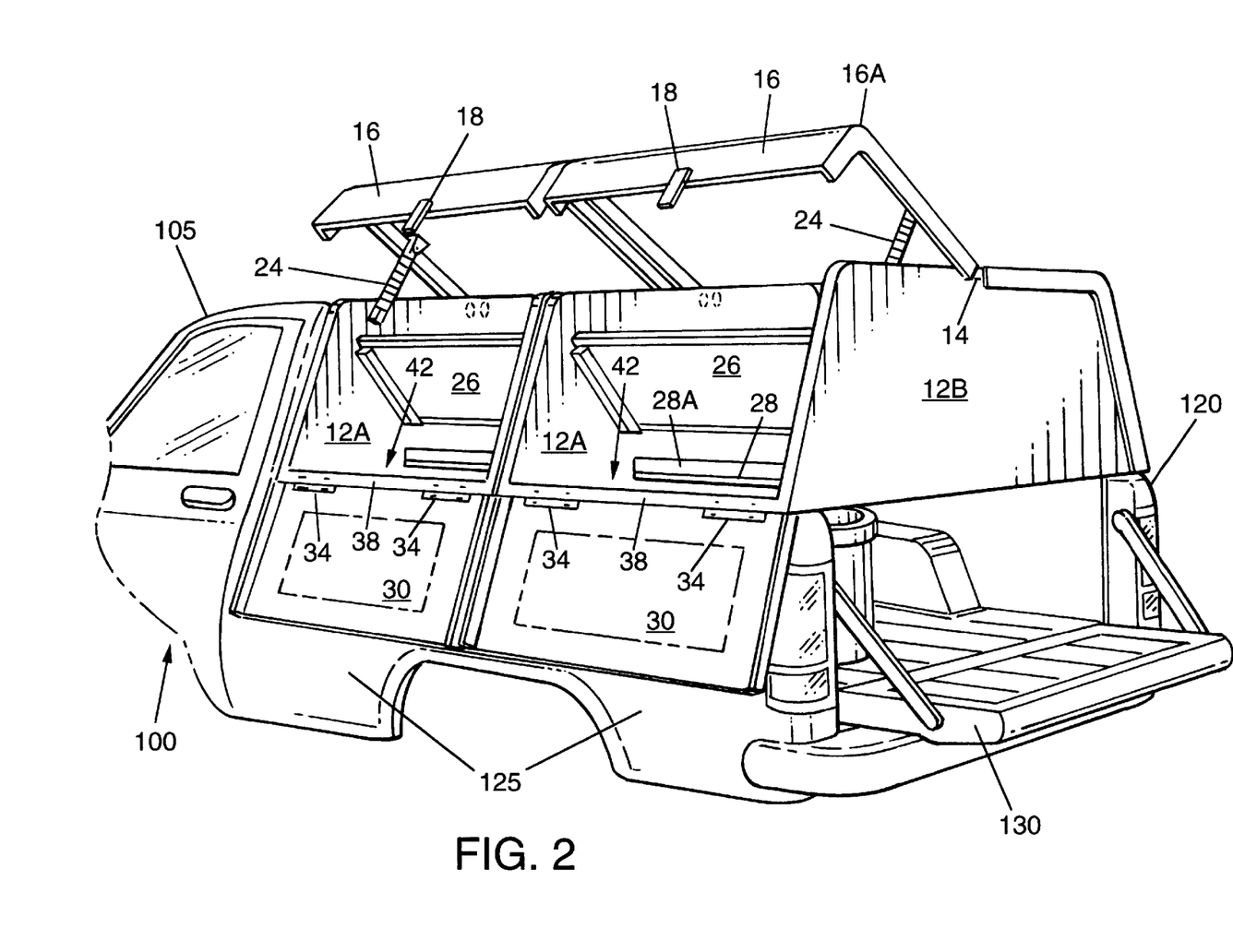
FIG. 2 is a left rear perspective view thereof showing the access doors opened.
Figure 3:
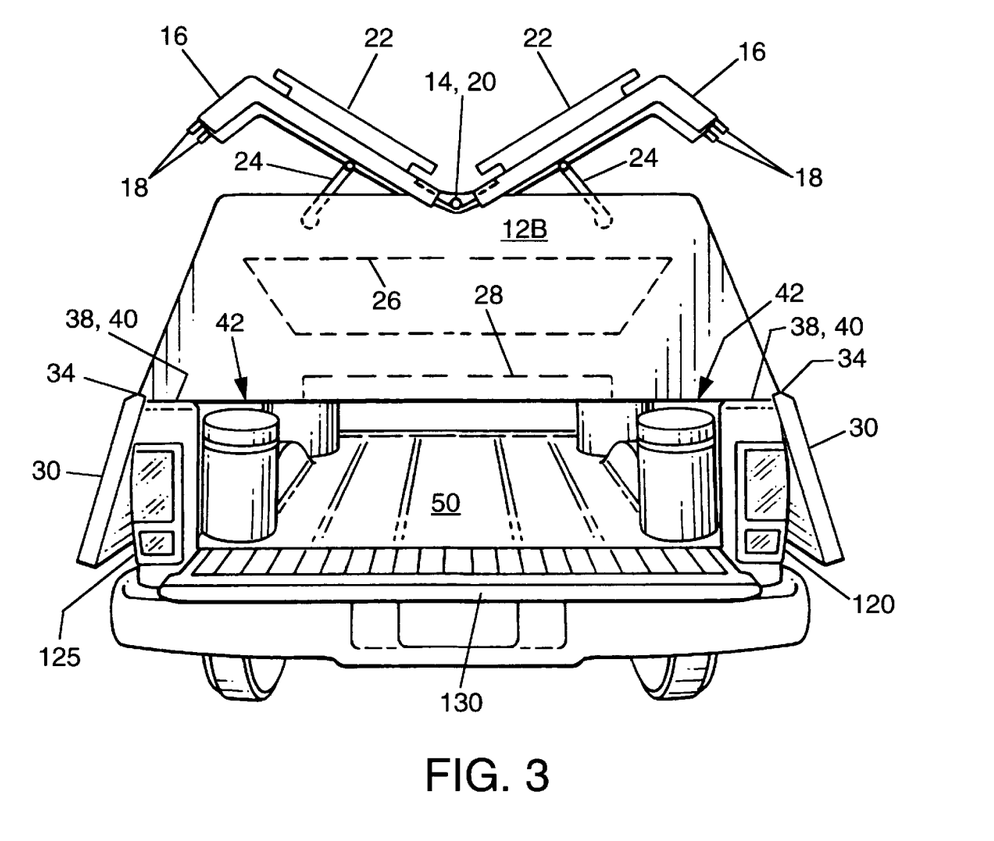
FIG. 3 is a rear view showing the access doors, and truck tailgate open.
Figure 4:
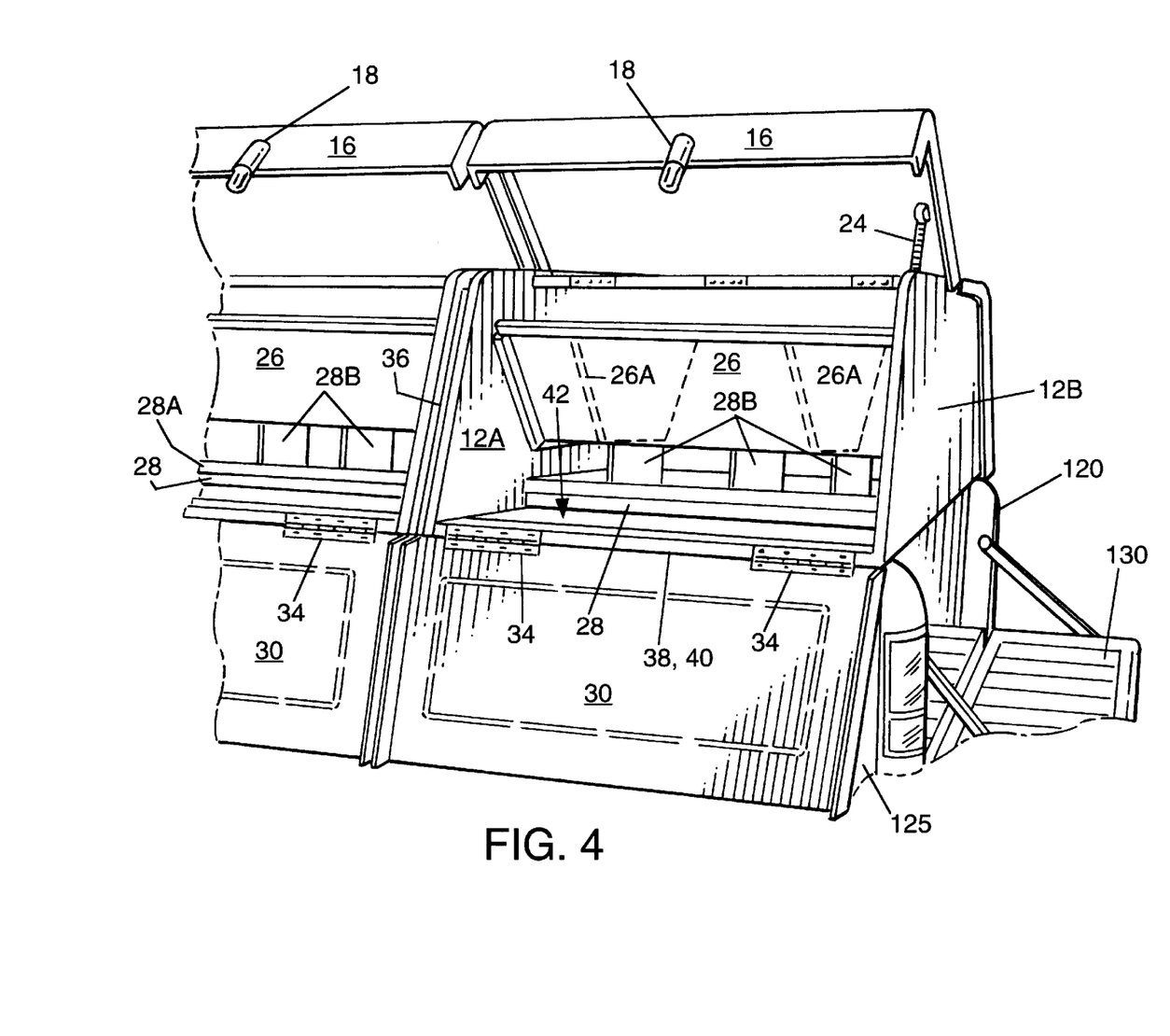
FIG. 4 is a left-side view showing the interior storage bin and tray.

As shown in FIGS. 1, 2 and 3, and more particularly in FIG. 4, there are two modular compartments: a front modular carrier compartment 10 and a rear modular carrier compartment 11, where each modular assembly is constructed identical to each other.

Providing a truck cap consisting of two independent but attachable modules expedites installation and removal of a module. Furthermore, each module is constructed of a light weight material such as a light weight ferrous metal, aluminum, plastic and fiberglas, for enhanced portability of a module and installation or removal of the cap in a one man operation.

Each modular truck cap is comprised of front and rear bulkheads, 12A and 12B, respectively, a top brace 14, top access doors 16 and side panel access doors 30.

Figure 6:
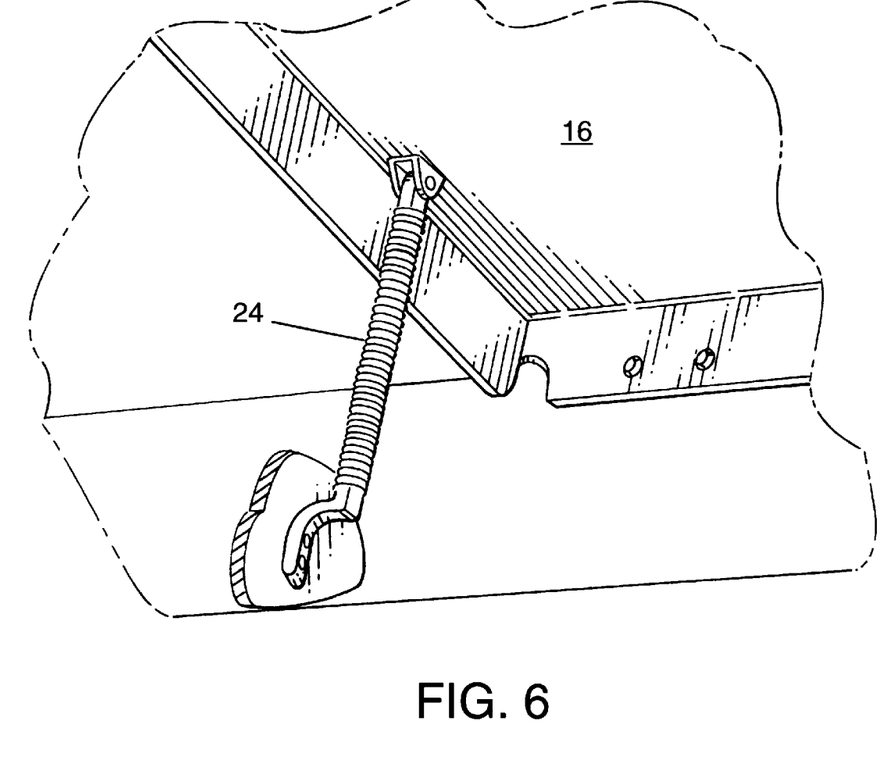
FIG. 6 is an enlarged detail view showing the snap-spring door holder.

The top access doors 16 are formed from a single piece comprising the roof of the present invention, the corner edge having a curved surface 16A, that extends angularly downward on the side surface to meet with the side panel access door 30, when closed. A top brace 14, running longitudinally, positioned centrally, supports the piano hinges 20 that are attached to the top access door 16. A snap spring 24 supports the top access door 16 and maintains it in the open position without the need for specialized bracing. This hold-open snap spring 24 is shown in further detail in FIG. 6.

Attached to the bottom surface of side panel access door 30 is the piano hinge 34. The other surface of the piano hinge 34 attaches to the mounting lip 38 at the base of the modular carrier. A gasketed elastomeric mounting seal 40 weatherproofs the doors, thereby protecting the contents found inside the carrier from exposure to adverse weather conditions.

Located atop each top access door is a roof rack 22 that is strategically placed centrally, along the longitudinal truck axis, to carry ladders, pipes or conduits that can be tethered down using ropes or elasticized bungee cords.

Either side of the pickup truck 100, the right side 120 or the left side 125, can be used to gain access to the storage area. The contents of the carrier module are protected from thievery by a latching lock mechanism 18.

Access to the interior of the carrier is gained by first unlocking and releasing the latch 18. The top access door 16 is then opened by lifting it in an upward direction. Grasping the handle 32, allows the lower side panel door to rotate pivotally downwards about its hinge 34 to expose the interior of the modular compartment of the present invention.

When both doors 16 and 30 are in their fully open positions, there is exposed, an upper storage bin 26, supported by angle brace 46, and having sloping walls for ease of access. The module bin includes a plurality of lateral dividers 26A. Below the upper storage bin 26 is the lower storage tray 28, extending laterally to an upward projecting edge 28A on each lateral side. The tray includes lateral dividers 28B with sloping walls for ease of access. Immediately in front of the lateral edge or extension of the lower storage tray 28 is a large opening 42 which functions as a pass-thru for items, such as, cans of paint, 5-gallon cans of asphalt, and the like, that rest on the load bed 50. Each bin divider 26A and tray divider 28B is aligned substantially normal to a direction of travel of the pickup truck to prevent translation of the stored contents.

With two modular carriers, 10 and 11, installed over the truck bed 110, the contents can be organized neatly within each carrier. For example, a maintenance worker could organize his tools, parts and equipment in a manner that is useful to the current job that he is performing: the left front module could house items associated with carpentry; the right front module, articles of plumbing; the left rear module, electrical repair tools and equipment; and the right rear module, machinery tools and replacement parts. There may be many other organizational needs, but are too numerous to enumerate—the keyword is that the present invention combines the organized storage and transportation versatility with module portability by a one man operation.

Yet concurrently, the truck cap allows access to the entire truck bed while standing alongside the pickup. Thus, the tradesman or technician need not enter or, more accurately, squeeze under the cap to retrieve items. The tailgate, front wall, sidewall and lateral extension of each lower storage tray together define a reach-in or pass-through area to remove the largest tools or containers that are ordinarily stored there, without physical entry under the modules or into the load bed.

Figure 5:
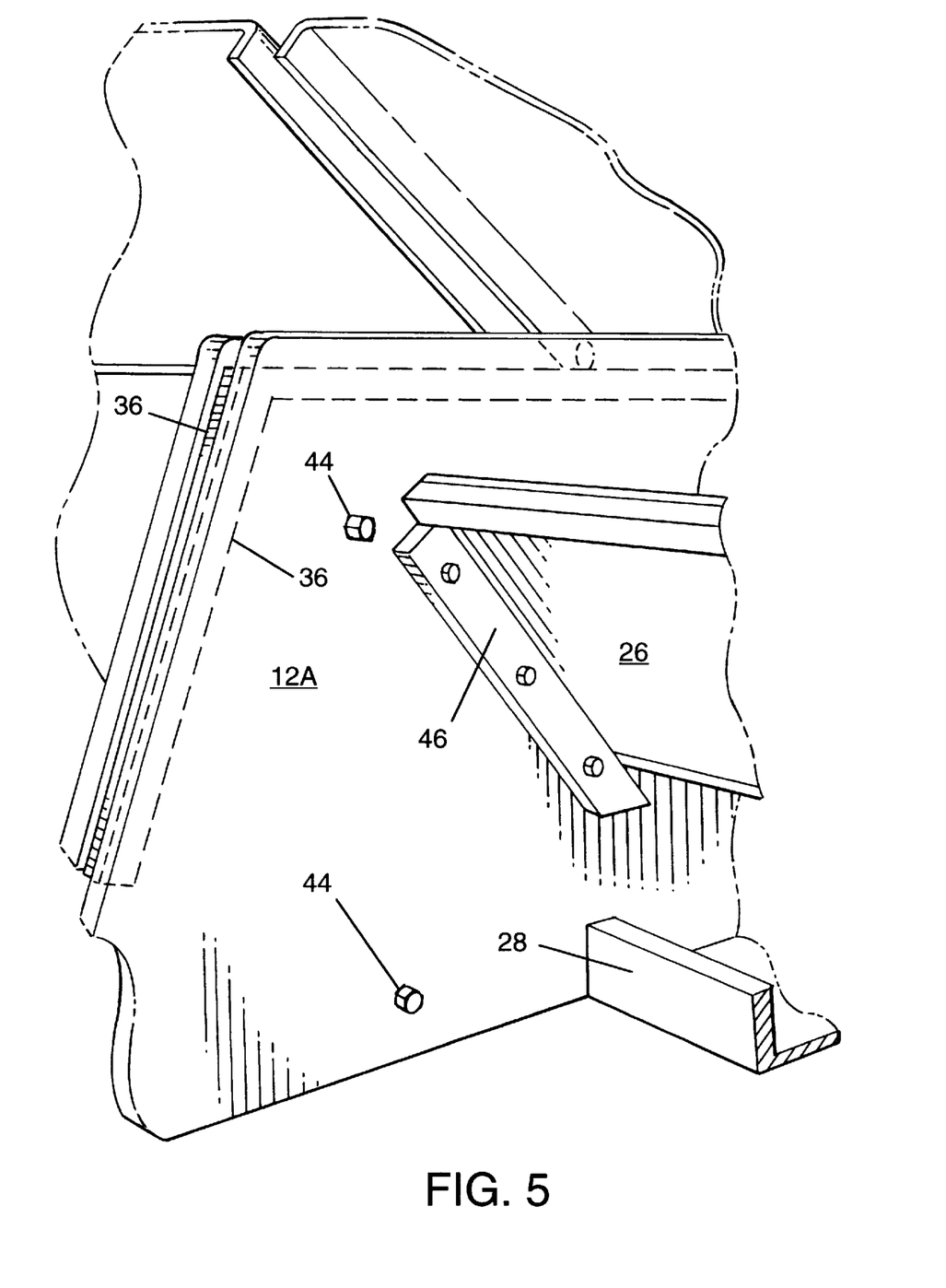
FIG. 5 is an enlarged detail view showing the joining seal.

Upon installation of the modular carrier enclosures 10 and 11, the modules rest on the mounting lip 38, gasketed by mounting seal 40, on the sidewalls 120 and 125 of the pickup truck 100. Completing the installation, the two modules 10 and 11 are connected and joined together using attaching bolts 44 as shown in FIG. 5. The joint between the two modular carriers is sealed by joining seal 36.

A centrally located drip channel, formed in the top brace 14, is one that is cascaded from one modular compartment to another. The flow of rainwater is directed off the top of the cap and is kept from collecting by diverting it downwardly via its respective channel contained in the joining seal 36.

Figure 7:
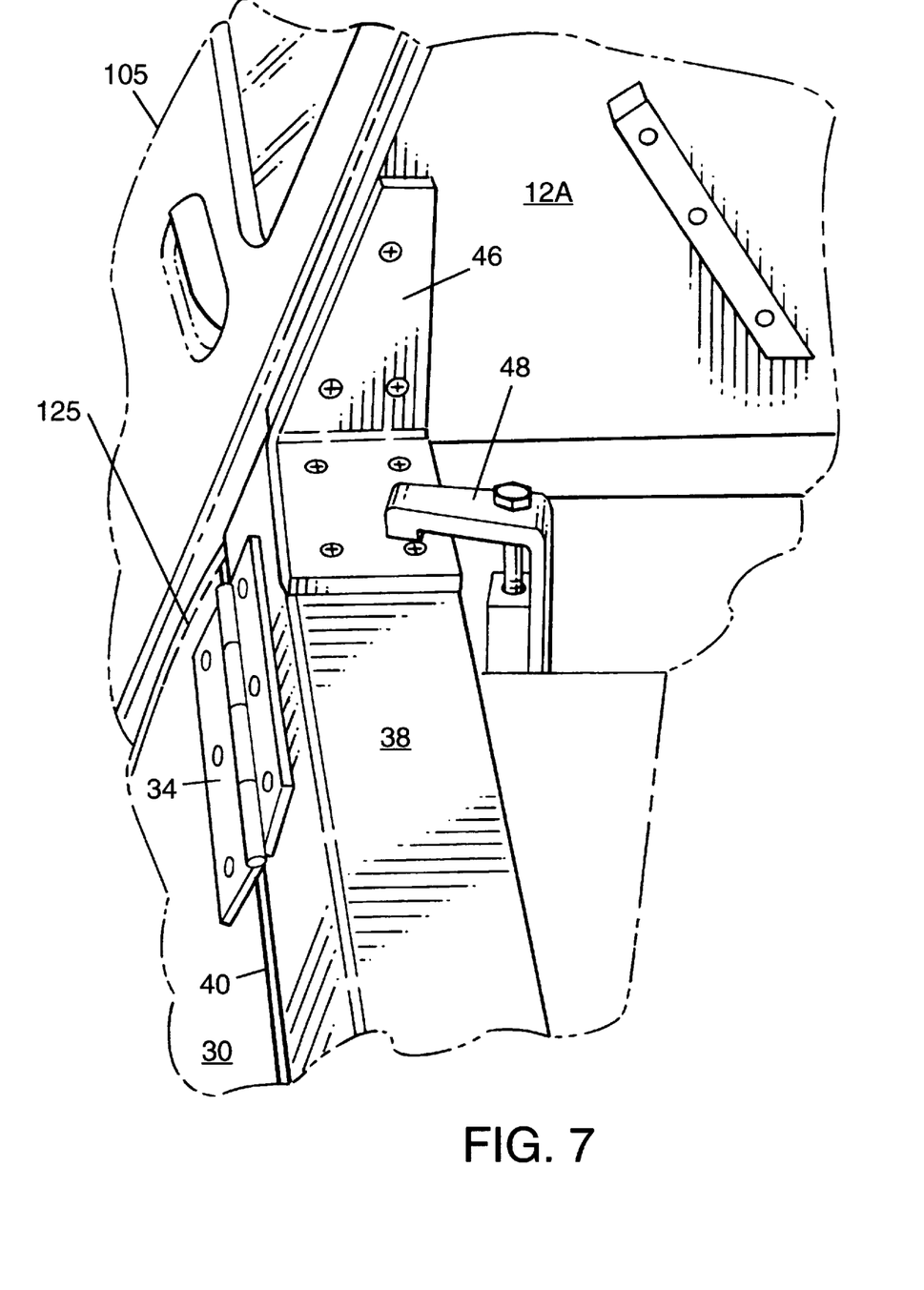
FIG. 7 is an enlarged detail view showing one of the clamps used to secure the carrier to the truck bed.

Turning now to FIG. 7, there is shown an enlarged view detailing typically one of the clamps 48 that is used to attach and secure the modular carrier to the sidewall 125 of the pickup truck 100.

It should be understood that there may be numerous modifications, advances or changes that can be made to the present invention, but in doing so, it is intended that they should not detract from the true spirit of the present invention.

I claim:

1. A removable and portable cap for a pickup truck having a forward cab and a rear load bed that is bounded by a front wall, right and left sidewalls, and a rear tailgate, comprising:

an at least one independent module positioned above load bed, and having front and rear bulkheads, a top brace, right and left centrally hinged upper doors that open upwardly and a frictional hold-open snap-spring associated with each of the upper doors for maintaining the upper doors in an open position; further comprising lower right and left drop-down hinged doors that mate with the hinged upper doors to securely close each module; and, means for removably mounting the at least one module to the truck bed sidewalls.

2. The removable and portable cap for a pickup truck according to claim 1, the at least one module comprising first and second identical modules, each removably secured to the load bed sidewalls with the first module positioned in front of the second module.

3. The removable and portable cap for a pickup truck according to claim 2, each upper door of each module comprising a single piece providing a module roof and side with a comer edge having a curved surface that extends angularly downward on the module side meeting with the lower access door when closed.

4. The removable and portable cap for a pickup truck according to claim 3, each module having an upper storage bin with sloping walls supported by an angle brace and including a plurality of dividers and a lower tray extending laterally to an upward edge projection with a plurality of dividers each divider having a sloping wall for ease of access to organize stored contents being transported, and for ease of separating and inventorying each item;

wherein each divider of each bin and tray is aligned substantially normal to a direction of travel of the pickup truck to prevent translation of the stored contents.

5. The removable and portable cap for a pickup truck according to claim 4, each module having a pass-thru opening on each side of the truck between the lateral edge of each tray of each module and the truck sidewalls, for allowing access to items being stored and transported on the load bed.

6. The removable and portable cap for a pickup truck according to claim 5, wherein each module includes a locking mechanism to secure each of the upper and lower doors for preventing unauthorized access to the contents being transported that lie within and beneath each module.

7. The removable and portable cap for a pickup truck according to claim 6, each module further comprising a cascaded centrally located drip cap to direct the flow rainwater off the top of the cap and to keep it from collecting by diverting it downwardly.

8. The removable and portable cap for a pickup truck according to claim 7, wherein each module is removably secured to the truck bed sidewalls with an at least one hold-down clamp.

9. The removable and portable cap for a pickup truck according to claim 8, wherein each module is identical, such that when removed, the modules are stackable for storage, thereby utilizing a minimal footprint in the storage area.

10. The removable and portable cap for a pickup truck according to claim 9, wherein the pass-thru is sufficiently large for storage and removal of items stored in 5-gallon cans or drums.

11. The removable and portable cap for a pickup truck according to claim 10, each sidewall including an upper peripheral portion comprising a substantially horizontal mounting lip with a mounting seal; and, wherein each module rests on the mounting seal.

12. The removable and portable cap for a pickup truck according to claim 11, wherein the first and second modules are joined together with a joining seal therebetween.

13. The removable and portable cap for a pickup truck according to claim 12, each module further comprising a roof rack, associated with the upper access doors, that is centrally positioned along a longitudinal truck axis to carry ladders, pipes or conduits that can be tethered down using rope or elasticized bungee cords.

14. The removable and portable cap for a pickup truck according to claim 13, wherein each module is constructed of a light weight material selected from the group consisting of a thin ferrous metal, aluminum, plastic and fiberglas for enhanced portability of a module and removal of the cap in a one man operation.

15. For a pickup vehicle of a type having a front cab, and a bottom panel, a front wall, and opposite side panels cooperating to bound a rear pickup cargo compartment for receiving a plurality of articles in the rear of said vehicle, each of said side panels having an inward facing lateral edge portion, a tailgate pivotally mounted to serve as a closure for the rear pickup cargo compartment opening, an at least one storage module with upright forward and rear bulkheads resting on said edges, removably secured to said side panels with an angle brace over the compartment, and having centrally hinged right and a left upper access doors each opening upwardly with a snap-spring maintaining an open position, that mate with a respective right and a left lower pivotally mounted side access door for a secure closure, each module containing a lower storage tray supported between said walls and extending laterally to a raised lateral edge on each side, said front wall, sidewall and lateral edge together defining a reach-in opening, whereby access into an entire region of said rear vehicle compartment is through the reach-in opening of said at least one module while standing alongside the pickup without physically entering the compartment to remove tools or containers stored therein.

16. A pickup truck for transporting passengers in a front cab and cargo, the pickup truck comprising spaced apart first and second side structures, opposed end structures and a floor structure, such that the side structures, end structures and floor structure together define a load bed for receiving a plurality of said cargo, the load bed having a longitudinal direction substantially aligned with a direction of travel of the pickup truck and a transverse direction substantially normal thereto, the floor structure of the pickup truck comprising a cargo support within said load bed which provides a cargo support surface, the load bed including a first module and an identical second module with the first module forward of the second module, said first and second modules placed completely over the entirety of said load bed, and the first module removably connected to the second module, each module releasably attached to said side structures and including an at least one access door on each side of each module, and each module containing a lower tray extending transversely to a tray edge on each module side being a distance from each of said side structures to present a reach-in opening on each side of, and under, each module, whereby one hundred percent of the load bed can be accessed while standing alongside the pickup truck without removal of, or physical entry under, the first or second module.

* * * * *